J. G. PERRY.
Sausage Filler.

No. 29,814.

Patented Aug. 28, 1860.

Witnesses
E. B. Potts
John S. Adams

Inventor
John G. Perry

UNITED STATES PATENT OFFICE.

JOHN G. PERRY, OF SOUTH KINGSTON, RHODE ISLAND.

SAUSAGE-FILLER.

Specification of Letters Patent No. 29,814, dated August 28, 1860.

*To all whom it may concern:*

Be it known that I, JOHN G. PERRY, of South Kingston, in the county of Washington, in the State of Rhode Island, have invented a new and Improved Machine for Filling Sausages; and I do hereby declare that the following is a full and correct description thereof, reference being had to the accompanying drawings and to the letters of reference marked thereon, the same letters in both figures denoting the same parts.

Figure 1:
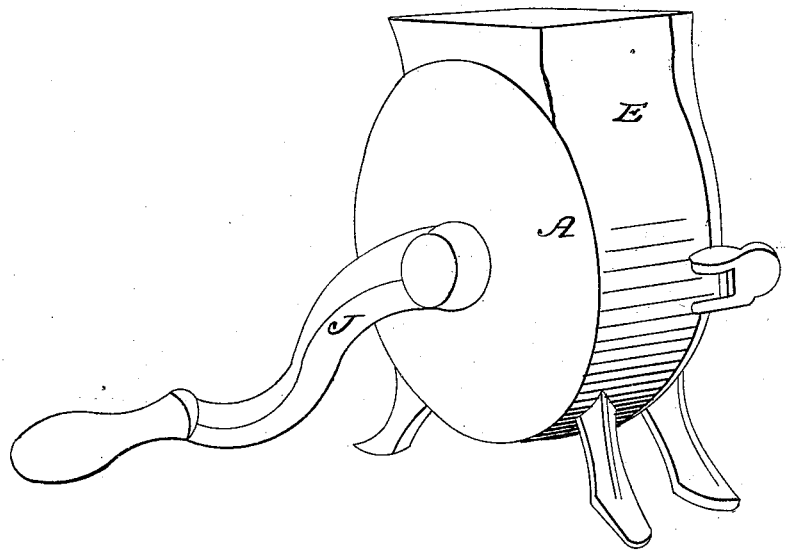
Figure 2:
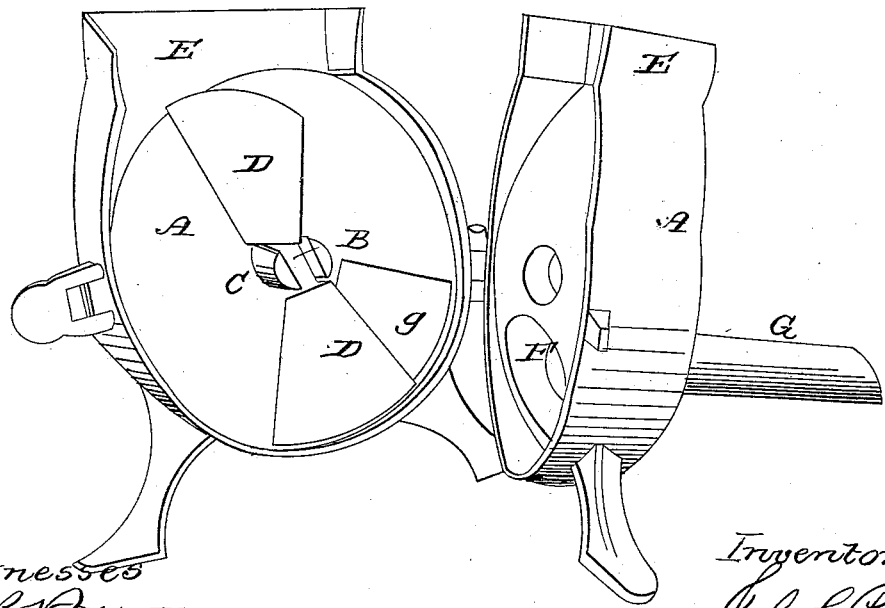

In these drawings, Figure 1, is a perspective view of the machine. Fig. 2, is a view of the same open so as to show the inside.

To construct my improved sausage filler, make a case of two circular plates, one or both of which should be beveled from the center to the edge, or of a broad conical shape inside, and having around their edges a projecting rim, similar to that of a box pulley, only that it is made wide on one side and narrows away nearly down to the plate upon the other side. This rim may be all on one plate, or a part of it on each. These two plates are put together with the rims between them, the widest part on each being put together so as to form a box or case A, the cavity of which will be wide on one side of the center, and narrow on the other side. The two parts of this case are hinged together at the narrow side, and connected by a catch on the wide side. A shaft C, is put through the center of the case having its end forked so as to receive the rod or spindle B, which has a fan shaped vane fast on each end D, D. The size and shape of these vanes are governed by the size and shape of the cavity of the case in its widest part. The vane on one end of the spindle should be nearly square to the plane of the one on the other end, so that while one vane lies flat to the plate in the narrow part of the case, the other one will lie nearly straight across the cavity at its widest part.

A hopper E, to receive the meat, is formed by cutting away the rims of the plates just above the widest part, and putting around the opening a properly shaped flange. An opening F, is made near the bottom in one of the plates, to discharge the meat, and a tube G is put into it to receive the cases to be filled. A spring or gate $q$, is placed at the narrowest part of the cavity of the case, and is opened by the action of the vane, or a projection upon the shaft C. The machine works very well without this gate or spring, but as it adds somewhat to its efficiency by preventing a small portion of the meat from passing through the cavity, I have thought best to use it.

The operation of the filler is as follows: When the shaft and vanes are turned by the crank J, the vane that is leaving the widest part of the case, and approaching the narrowest part, is turned around edgewise by the shape of the plates or sides of the cavity; and as this vane is turned edgewise, it turns the other which is leaving the narrow part of the cavity, by the spindle which connects them; around, across the cavity, so as to present a broadside forward and sweep the cavity between the plates clear of whatever may be put in, so when the meat is thrown into the hopper E, it is carried down by the vanes D, D, and as they leave the widest part, and turn edgewise they press it out of the orifice F, through the tube into the cases placed upon it.

Having thus described my invention, what I claim and desire to secure by Letters Patent is:

The combination of the vanes and case, substantially as described herein, and for the purposes set forth.

JOHN G. PERRY.

Witnesses:
G. W. POTTER,
JOHN T. ADAMS.